US012786499B2

(12) United States Patent
Fan et al.

(10) Patent No.: US 12,786,499 B2
(45) Date of Patent: Nov. 3, 2026

(54) VEHICLE-MOUNTED TERMINAL, VEHICLE-MOUNTED PLAYBACK SYSTEM, AND VEHICLE-MOUNTED AUDIO PLAYBACK METHOD

(71) Applicant: Tianjin Yunfan Electronic Technology Co., Ltd., Tianjin (CN)

(72) Inventors: Qingzhuang Fan, Tianjin (CN); Shengshi Wang, Tianjin (CN)

(73) Assignee: Tianjin Yunfan Electronic Technology Co., Ltd., Tianjin (CN)

( * ) Notice: Subject to any disclaimer, the term of this patent is extended or adjusted under 35 U.S.C. 154(b) by 0 days.

(21) Appl. No.: 19/069,167

(22) Filed: Mar. 3, 2025

(65) Prior Publication Data

US 2026/0261728 A1 Sep. 3, 2026

(51) Int. Cl.

| | |
|---|---|
| ***H04N 21/414*** | (2011.01) |
| ***G06F 3/16*** | (2006.01) |
| ***H04W 4/40*** | (2018.01) |
| ***H04W 4/80*** | (2018.01) |

(52) U.S. Cl.

CPC ....... *H04N 21/41422* (2013.01); *G06F 3/162* (2013.01); *H04W 4/40* (2018.02); *H04W 4/80* (2018.02)

(58) Field of Classification Search

CPC ........... H04W 4/80; H04W 4/40; G06F 3/162; H04N 21/41422

See application file for complete search history.

(56) References Cited

U.S. PATENT DOCUMENTS

2015/0245181 A1* 8/2015 Bai ........................ H04W 4/16 455/414.1
2017/0155998 A1* 6/2017 Boesen ............... G06F 16/4387
2022/0261210 A1* 8/2022 Kovalenko ............. G06F 3/165

FOREIGN PATENT DOCUMENTS

CN 119255213 * 1/2025

* cited by examiner

*Primary Examiner* — Yassin Alata
(74) *Attorney, Agent, or Firm* — AVEK IP, LLC

(57) ABSTRACT

The present disclosure relates to the field of wireless communication technology, and particularly, to a vehicle-mounted terminal, a vehicle-mounted playback system, and a vehicle-mounted audio playback method. A first connection is established between the vehicle-mounted terminal and a smart terminal. When the smart terminal sends a video transmission request to the vehicle-mounted terminal via the first connection, the vehicle-mounted terminal responds to the video transmission request. When the smart terminal sends an audio transmission request to the vehicle-mounted terminal via the first connection, the vehicle-mounted terminal ignores the audio transmission request. In this way, user's need for sound to be output from other audio devices can be satisfied.

19 Claims, 4 Drawing Sheets

VEHICLE-MOUNTED TERMINAL, VEHICLE-MOUNTED PLAYBACK SYSTEM, AND VEHICLE-MOUNTED AUDIO PLAYBACK METHOD

FIELD

The present disclosure relates to the field of wireless communication technology, and particularly, to a vehicle-mounted terminal, a vehicle-mounted playback system, and a vehicle-mounted audio playback method.

BACKGROUND

CarPlay and Android Auto are two technology standards for connecting smartphones to in-car entertainment systems, allowing drivers to access and control apps on their smartphones via the vehicle's display, providing a safer and more convenient in-car experience.

When a smartphone is connected to a vehicle screen via CarPlay or Android Auto, all sounds from the smartphone (including those from calls, music apps, and map navigation apps) are played through the vehicle's audio system. Even if the smartphone is simultaneously connected to other audio devices, the sound will still be played through the vehicle's audio system.

Thus, it is difficult to meet user's need for sound output through other audio devices.

SUMMARY

The present disclosure provides a vehicle-mounted terminal. A first connection is established between the vehicle-mounted terminal and a smart terminal. When the smart terminal sends a video transmission request to the vehicle-mounted terminal via the first connection, the vehicle-mounted terminal responds to the video transmission request. When the smart terminal sends an audio transmission request to the vehicle-mounted terminal via the first connection, the vehicle-mounted terminal ignores the audio transmission request.

BRIEF DESCRIPTION OF THE DRAWINGS

The following detailed description of the embodiments of the present disclosure will be provided in conjunction with the accompanying drawings.

REFERENCE NUMERALS IN THE DRAWINGS

11. vehicle-mounted terminal; 111. vehicle communication circuit; 112. display screen; 113. vehicle audio circuit; 12. smart terminal; 121. terminal communication circuit; 122. memory; 13. audio terminal; 131. audio communication circuit; 132. terminal audio circuit.

DETAILED DESCRIPTION

It should be noted that, without conflict, the embodiments and features of the embodiments in the present disclosure can be combined with each other. The preferred embodiments of the present disclosure will now be described in detail with reference to the accompanying drawings.

Figure 1:
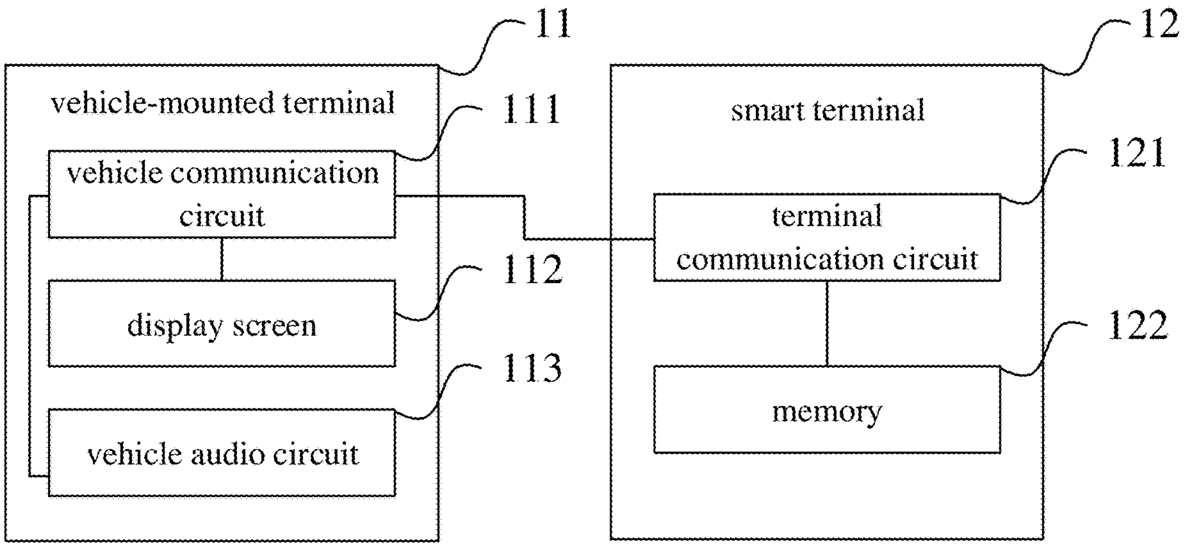
FIG. 1 is a block view of a vehicle-mounted terminal according to some embodiments of the present disclosure.

Referring to FIG. 1, FIG. 1 is a block view of a vehicle-mounted terminal according to some embodiments of the present disclosure. The vehicle-mounted terminal 11 is connected to a smart terminal 12. The smart terminal 12 can be any of a smartphone, tablet, laptop, or wearable smart terminal. The smart terminal 12 includes a terminal communication circuit 121 and a memory 122. The memory 122 stores target data to be played. The target data include at least one of video data and audio data. The vehicle-mounted terminal 11 includes a vehicle communication circuit 111, a display screen 112, and a vehicle audio circuit 113. The vehicle communication circuit 111 and the terminal communication circuit 121 are capable of establishing a first connection. The first connection includes at least one of a wired connection and a wireless connection. The vehicle-mounted terminal 11 can communicate with the smart terminal 12 through the first connection, for example, receiving the video data sent by the smart terminal 12 and playing the video data.

Since the vehicle communication circuit 111 and the terminal communication circuit 121 have established the first connection, it should be understood that all communication interactions between the vehicle-mounted terminal 11 and the smart terminal 12, including information transmission and data transfer, are carried out through the first connection.

Upon receiving user input, such as a screen mirroring instruction, the smart terminal 12 transmits the target data for playback. Specifically, the smart terminal 12 first requests the vehicle-mounted terminal 11 to transmit the target data, and more specifically, sends a video transmission request and/or an audio transmission request to the vehicle-mounted terminal 11 for the video data and/or the audio data. The vehicle-mounted terminal 11 may then receive the video transmission request and/or the audio transmission request.

The vehicle-mounted terminal 111 does not receive and process audio-type data, and may respond to the video transmission request but ignore the audio transmission request, meaning that the vehicle-mounted terminal 111 may not respond to the audio transmission request. After receiving a response from the vehicle-mounted terminal 111 based on the video transmission request, the smart terminal 12 transmits the video data to the vehicle-mounted terminal 111. The vehicle-mounted terminal 111 receives the video data and plays the video data through the display screen 112.

Since the smart terminal 12 did not receive a response from the vehicle-mounted terminal 111 for the audio transmission request, the smart terminal 12 may not transmit the audio data to the vehicle-mounted terminal 111. Instead, the smart terminal 12 may transmit the audio data to an audio terminal 13, which is capable of playing the audio data, thus achieving playback of the audio data through the audio terminal 13. In this way, the video data from the smart terminal 12 is played on the display screen 112 of the vehicle-mounted terminal 111, while the audio data is played through an audio circuit of the audio terminal 13, fulfilling user's personalized requirements.

In some embodiments, the vehicle-mounted terminal 111 receives a user-input setting instruction, which indicates that the vehicle-mounted terminal 111 is in a first preset state.

When in the first preset state, the vehicle-mounted terminal 111 can only receive and process video-type data and may not receive audio-type data. As a result, when sending the target data to the vehicle-mounted terminal 111, the smart terminal 12 can only send the video data and not the audio data. The audio data from the smart terminal 12 may then be transmitted to the audio terminal 13. In this way, the video data is played on the vehicle-mounted terminal 111, while the audio data is played on the audio terminal 13.

In some embodiments, the vehicle-mounted terminal 111 can be set to a second preset state according to another user-input setting instruction. When the vehicle-mounted terminal 111 is in the second preset state, the vehicle-mounted terminal 111 can receive and process both the video-type data and the audio-type data, allowing the user to input a corresponding setting instruction based on actual needs, enabling the vehicle-mounted terminal 111 to flexibly switch between different preset states to meet user's different requirements.

In some embodiments, the first connection is a Wi-Fi connection/Bluetooth connection. For example, when establishing the first connection, the vehicle-mounted terminal 111 and the smart terminal 12 perform a Bluetooth pairing. After a Bluetooth connection is successfully established between the vehicle-mounted terminal 111 and the smart terminal 12, a Wi-Fi function is activated, then a Wi-Fi connection is established between the smart terminal 12 and the vehicle-mounted terminal 111, and the Bluetooth connection is then disconnected. The Bluetooth pairing process is relatively simple and does not require complex setup or operations, allowing users to quickly complete an initial connection between the vehicle-mounted terminal 111 and the smart terminal 12, which lays a foundation for the subsequent Wi-Fi connection. For example, some vehicle-mounted terminals 111 can pre-establish a Bluetooth connection with the user's smart terminal 12 before the user unlocks and enters a vehicle. Once the user enters the vehicle, they can immediately begin using various services, saving time. After the Bluetooth connection is successfully established, activating the Wi-Fi function and connecting to the smart terminal 12 via Wi-Fi can take full advantage of Wi-Fi's benefits in terms of transmission distance, speed, and power consumption. This provides more stable and efficient support for data transmission between the vehicle-mounted terminal 111 and the smart terminal 12, ensuring a normal operation of various applications. A transmission speed of Wi-Fi can reach tens of Mbps or even hundreds of Mbps, enabling a rapid transmission of large amounts of data, meeting high-speed data transfer requirements for HD video playback, large file transfers, and so on, providing a smoother user experience. Under a same data transmission load, the Wi-Fi connection typically has lower power consumption, which helps extend battery life of both the vehicle-mounted terminal 111 and the smart terminal 12, reducing user's concern about battery life of the devices. Disabling the Bluetooth connection avoids potential signal interference that could occur when both Bluetooth and Wi-Fi are working simultaneously, enhancing stability of the Wi-Fi connection and reliability of data transmission. Moreover, disconnecting the Bluetooth connection further reduces power consumption and extends battery life.

In some embodiments, the vehicle-mounted terminal 111 is connected to the smart terminal 12 via Wi-Fi, and can send a media request to the smart terminal 12. The media request is used to specify that the audio data in the smart terminal 12 should be preferentially transmitted via Wi-Fi. Thus, before transmitting the target data, the smart terminal 12 first sends the audio transmission request to the vehicle-mounted terminal 111. When the audio transmission request is not responded, the smart terminal 12 sends the audio transmission request to the audio terminal 13. Since the audio transmission terminal connected via the second connection can be specified by the user-such as connecting A, B, and C terminals via Bluetooth, and the user designates the terminal C as the audio terminal 13. In this way, competition and interference between the smart terminal 12 and the audio terminal 13 can be reduced. This helps ensure stability and continuity of audio data transmission and avoids unnecessary interference that could affect the audio transmission.

In some embodiments, when the video data is played through the vehicle-mounted terminal 111 and the audio data is played through the audio terminal 13, the user may need to adjust playback parameters. For example, the user may want to fast-forward, rewind, or play at an accelerated speed. In such cases, it may not be convenient for the user to operate the smart terminal 12 directly. Instead, the user can input a control instruction on the vehicle-mounted terminal 111, such as dragging a progress bar or long-pressing the screen. After detecting the corresponding operation, the vehicle-mounted terminal 111 parses the control instruction, such as fast-forwarding or changing the playback speed, and forwards the parsed control instruction to the smart terminal 12. Upon receiving the control instruction, the smart terminal 12 adjusts the playback parameters of the audio data and/or the video data. The adjusted audio data are then output to the audio terminal 13 and the video data are output to the vehicle-mounted terminal 111. In this way, the audio and video playback can be adjusted synchronously, enhancing the user's audiovisual experience.

In some embodiments, when the first connection is the wired connection, the vehicle-mounted terminal 111 outputs audio only through a "Aux Out" channel. The audio data may be transmitted exclusively through this channel and not through other channels (e.g., the vehicle's speakers). That is, the audio data can only be output through the Auxiliary output port (wired audio interface), which is typically used to connect external audio devices such as sound systems, headphones, or other audio device.

When a wired audio device, such as headphones, is connected to the wired audio interface, it indicates that the audio data can be output through the wired audio device. However, when no wired audio device is connected to the wired audio interface, the audio data cannot be properly output. To ensure user experience, in this case, another audio terminal 13 is required to play the audio data, ensuring that the target data can be played normally.

Therefore, in this embodiment, whether the wired audio device is connected to the wired audio interface is detected. When the wired audio device is connected, the audio transmission request is responded, the audio data are received, and the audio data are played through the connected wired audio device. Both the audio date and the video data are provided synchronously by the smart terminal 12, ensuring no latency issues during playback.

When no wired audio device is connected, the audio transmission request can be ignored. As a result, the smart terminal 12 may not receive a response from the vehicle-mounted terminal 111 to the audio transmission request and therefore may not send the audio data to the vehicle-mounted terminal 111. Instead, the smart terminal 12 may transmit the audio data to the audio terminal 13, which is capable of playing the audio data.

Figure 2:
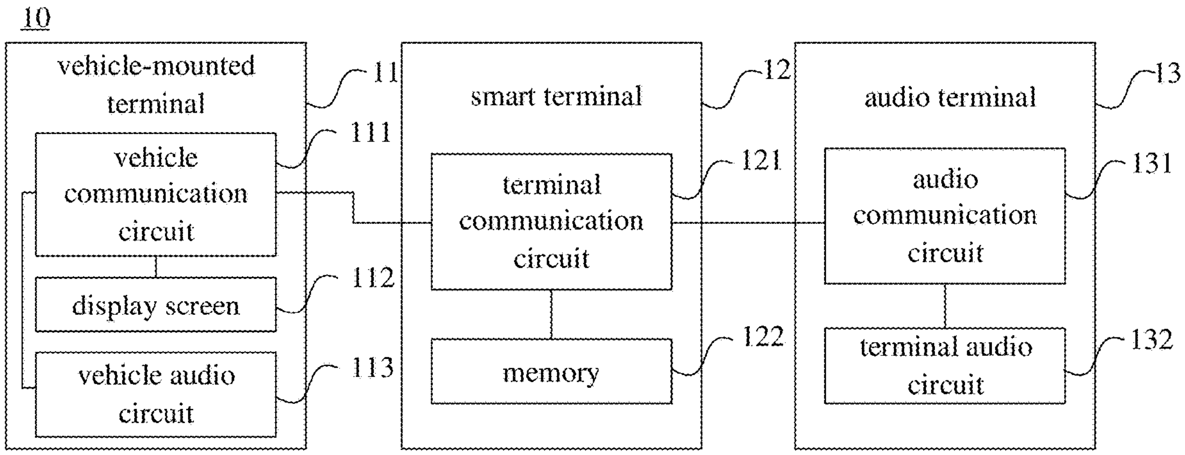
FIG. 2 is a block view of a vehicle-mounted playback system according to some embodiments of the present disclosure.

Referencing FIG. 2, FIG. 2 is a block view of a vehicle-mounted playback system according to some embodiments of the present disclosure. The vehicle-mounted playback system 10 includes a vehicle-mounted terminal 11, a smart terminal 12, and an audio terminal 13. The smart terminal 12 can be any one of a smartphone, tablet, laptop, and wearable smart terminal. The vehicle-mounted terminal 11 includes a vehicle communication circuit 111, a display screen 112, and a vehicle audio circuit 113. The smart terminal 12 includes a terminal communication circuit 121 and a memory 122. The memory 122 stores target data to be played. The target data includes video data and audio data. The audio terminal 13 includes an audio communication circuit 131 and a terminal audio circuit 132. The vehicle communication circuit 111 and the terminal communication circuit 121 can establish a first connection between each other. The first connection may be either a wired connection or a wireless connection. The terminal communication circuit 121 and the audio communication circuit 131 can establish a second connection between each other. The second connection can also be the wired connection or the wireless connection.

The vehicle-mounted terminal 11 can communicate with the smart terminal 12 via the first connection. For example, the vehicle-mounted terminal 11 can receive the video data sent by the smart terminal 12 and play the video data. The audio terminal 13 can communicate with the smart terminal 12 via the second connection. For instance, the audio terminal 13 can receive the audio data sent by the smart terminal 12 and play the audio data.

The second connection may be the wireless connection, such as Bluetooth. In some embodiments, when the application scenario is in-car use, the vehicle-mounted terminal 11 refers to an integrated in-car display or an additionally mounted vehicle-mounted display device. The audio terminal 13 refers to a Bluetooth audio device or an integrated in-car audio device. The smart terminal 12 refers to a smartphone. For example, a user can display the screen content from the smartphone on the vehicle-mounted display device and simultaneously play the audio from the smartphone through the vehicle-mounted audio device. Simultaneously, the vehicle's original multifunctional steering wheel controls and the original vehicle microphone are supported. Many modern vehicles are equipped with steering wheels that have multifunction buttons, allowing drivers to control various vehicle functions without removing their hands from the steering wheel. These functions may include audio control, phone control, navigation control, etc. When the smartphone is connected to the vehicle-mounted audio device to play sound, the buttons on the vehicle's multifunctional steering wheel can be used to control audio content on the smartphone, such as adjusting volume, switching songs, answering calls, etc. The vehicle-mounted audio device can be connected to the vehicle-mounted microphone. When the smartphone is connected to the vehicle-mounted audio device to play sound, and a call needs to be made, a built-in microphone in the vehicle can be used for voice input, while the vehicle-mounted audio device can be used for voice output, eliminating rely on a microphone on the smartphone.

Figure 3:
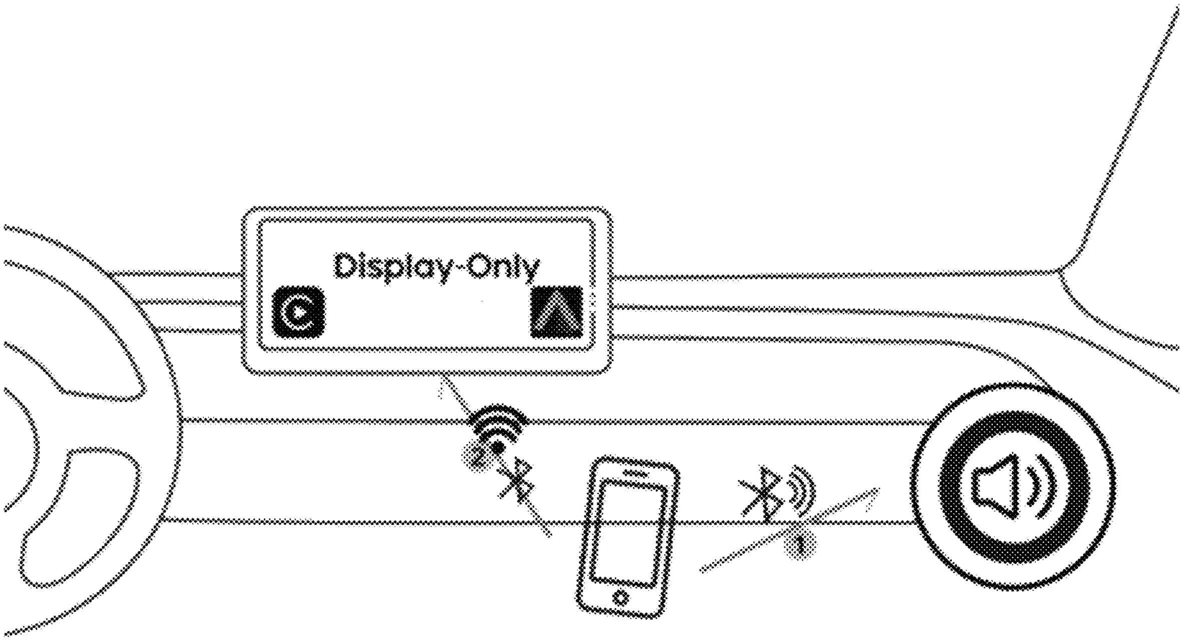
FIG. 3 is a schematic view of an application scenario of the vehicle-mounted terminal according to some embodiments of the present disclosure.

For example, in the scenario shown in FIG. 3, the vehicle-mounted terminal 11 is a display screen (Display-Only), the audio terminal 13 is a car audio system (represented by a speaker), and the smart terminal 12 is a smartphone. The first connection between the smart terminal 12 and the vehicle-mounted terminal 11 is connection 2 in FIG. 3, and the second connection between the smart terminal 12 and the audio terminal 13 is connection 1 in FIG. 3. In this scenario, the smartphone is connected to both the display screen and the car audio system. When the smartphone receives an instruction for screen mirroring, the smartphone sends a video transmission request and/or an audio transmission request to the display screen through connection 2, for example, simultaneously sending both a video transmission request and an audio transmission request. The display screen responds only to the video transmission request, thus the smartphone sends video data to the display screen through connection 2. Since the display screen ignores the audio transmission request, the smartphone cannot send audio data to the display screen through connection 2. The smartphone then automatically searches for other suitable devices or terminals to play the audio data. Specifically, the smartphone sends the audio transmission request to the car audio system via connection 1, and the car audio system responds to the audio transmission request. After receiving the response of the car audio system, the smartphone transmits the audio data to the car audio system. Since both the audio data and video data are synchronously output by the smartphone, no delay is existed, ensuring a seamless audio-visual experience for the user. In some embodiments, when the application scenario is for motorcycle riding, the vehicle-mounted terminal 111 is an integrated displayer on the motorcycle or an additionally mounted display device on the motorcycle, the audio terminal 13 is a Bluetooth audio player in the helmet or Bluetooth earphones worn by the user, and the smart terminal 12 is a smartphone. For example, the user can use the above method to display the screen content from the smartphone on the display device on the motorcycle and simultaneously play the audio from the smartphone through the Bluetooth earphones.

The second connection may also be a wired connection. In some embodiments, when the smartphone is not connected to an external audio device, the smartphone's own audio playback module can serve as the audio terminal 13. In this case, the audio terminal 13 is connected to the smart terminal 12 (smartphone) via the wired connection.

The smart terminal 12 sends the video transmission request and/or the audio transmission request to the vehicle-mounted terminal 111. The vehicle-mounted terminal 111 receives the video transmission request and/or the audio transmission request. Since the vehicle-mounted terminal 111 does not receive and process audio-type data, the vehicle-mounted terminal 111 responds to the video transmission request and ignores the audio transmission request, meaning the vehicle-mounted terminal 111 does not respond to the audio transmission request. As the smart terminal 12 does not receive a response from the vehicle-mounted terminal 111 based on the audio transmission request, it does not transmit the audio data to the vehicle-mounted terminal 111. Since the smart terminal 12 is connected to the audio terminal 13, the smart terminal 12 sends the audio transmission request to the audio terminal 13. The audio terminal 13 responds to the audio transmission request. Based on the response from the audio terminal 13 to the audio transmission request, the smart terminal 12 transmits the audio data to the audio terminal 13. Upon receiving the audio data, the audio terminal 13 plays the audio data. In this way, the video data from the smart terminal 12 is played on the display screen 112 of the vehicle-mounted terminal 111, while the audio data is played through the audio circuit of the audio terminal 13, meeting personalized needs of the user.

when the video data is played through the vehicle-mounted terminal 111 and/or the audio data is played through the audio terminal 13, the user may need to adjust playback parameters. For example, the user may want to fast-forward, rewind, or play at an accelerated speed. In such cases, it may not be convenient for the user to operate the smartphone directly. Instead, the user can input a control instruction on the vehicle-mounted terminal 111, such as dragging a progress bar or long-pressing the screen. After detecting the corresponding operation, the vehicle-mounted terminal 111 parses the control instruction, such as fast-forwarding or changing the playback speed, and forwards the parsed control instruction to the smart terminal 12. Upon receiving the control instruction, the smart terminal 12 adjusts the playback parameters of the audio data and/or the video data. The adjusted audio data are then output to the audio terminal 13 and the video data are output to the vehicle-mounted terminal 111. In this way, the audio and video playback can be adjusted synchronously, enhancing the user's audiovisual experience.

Figure 4:
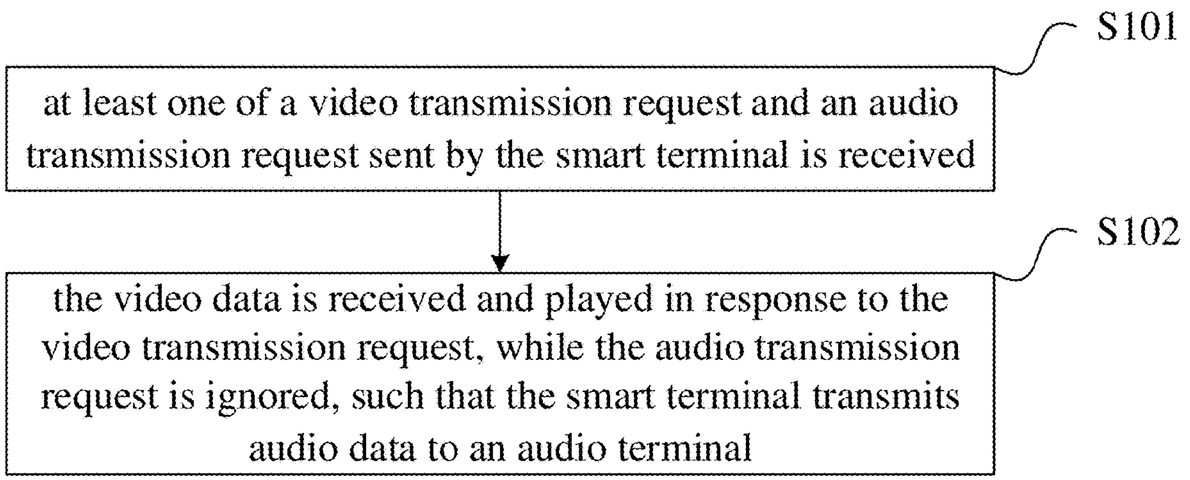
FIG. 4 is a flowchart of an audio playback method according to some embodiments of the present disclosure.

With reference to FIG. 4, FIG. 4 is a flowchart of an audio playback method according to some embodiments of the present disclosure. The audio playback method provided by the present disclosure includes the following operations S101-S102.

In the operation S101, at least one of a video transmission request and an audio transmission request sent by the smart terminal is received.

In the operation S102, the video data is received and played in response to the video transmission request, while the audio transmission request is ignored, such that the smart terminal transmits audio data to an audio terminal.

The vehicle-mounted terminal 111 receives the video transmission request and audio transmission request from the smart terminal 12 via the first connection. When the vehicle-mounted terminal 111 receives the video transmission request, the vehicle-mounted terminal 111 responds to the video transmission request and receives the video data. The vehicle-mounted terminal 111 processes the video data and plays corresponding video content, thereby meeting request of the smart terminal 12 for video transmission. Upon receiving the audio transmission request, the vehicle-mounted terminal 111 ignores the audio transmission request instead of processing the audio data. This means that the vehicle-mounted terminal 111 does not play the audio data. Since the vehicle-mounted terminal 111 ignores the audio transmission request, the smart terminal 12 may transmit the audio data to the audio terminal 13 based on the audio transmission request. The smart terminal 12 can transmit the audio data to the audio terminal 13 via the second connection, thereby fulfilling the need for audio playback.

The vehicle-mounted terminal 111 can effectively process the video transmission request and/or audio transmission request sent by the smart terminal 12, prioritizing the reception and playback of the video data while ignoring the audio data. This allows the smart terminal 12 to transmit the audio data to the audio terminal 13, enabling flexible transmission and playback of the audio data and video data. This process optimizes audio and video transmission experience while offering a more flexible and customized audio-visual playback solution.

One skilled in the art will appreciate that the full or partial processes of the methods in the above embodiments can be implemented by instructing the relevant hardware through a computer program. The program can be stored in a non-volatile computer-readable storage medium. When the program is executed, the processes as described in the embodiments of the methods above can be fulfilled. In the various embodiments provided in the present disclosure, any references to memory, storage, database, or other media can include both non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of example and not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), Rambus direct RAM (RDRAM), direct memory access dynamic RAM (DRDRAM), and memory bus dynamic RAM (RDRAM), etc.

The technical features of the above embodiments can be combined in any manner. For the sake of brevity, not all possible combinations of the technical features in the above embodiments have been described. However, as long as these combinations of technical features do not contradict each other, they should be considered within the scope of the disclosure described in this description.

It should be understood that the above embodiments are provided merely to illustrate the technical solutions of the present disclosure and are not intended to limit the present disclosure. For those skilled in the art, modifications to the technical solutions described in the above embodiments or equivalent substitutions of some of the technical features are possible. All such modifications and substitutions should fall within the protection scope of the claims of the present disclosure.

What is claimed is:

1. A vehicle-mounted terminal, wherein a first connection is established between the vehicle-mounted terminal and a smart terminal;

when the smart terminal sends a video transmission request to the vehicle-mounted terminal via the first connection, the vehicle-mounted terminal responds to the video transmission request, and when the smart terminal sends an audio transmission request to the vehicle-mounted terminal via the first connection, the vehicle-mounted terminal ignores the audio transmission request;

wherein, when the vehicle-mounted terminal responds to the video transmission request, the vehicle-mounted terminal receives and displays video data that is sent by the smart terminal via the first connection; when the vehicle-mounted terminal ignores the video transmission request, the smart terminal sends, via a second connection, audio data to an audio terminal; such that the vehicle-mounted terminal is configured to display only the video data, the audio data is capable of being played by the only audio terminal; the audio terminal is a terminal that is independent from a vehicle in which the vehicle-mounted terminal is mounted; the vehicle-mounted terminal is indirectly communicatively connected to the audio terminal;

the audio data and the video data are sent synchronously by the smart terminal; and the vehicle-mounted terminal is configured to:

receive and parse a control instruction, input by a user, for adjusting playback parameters;

forward the parsed control instruction to the smart terminal to enable the smart terminal to synchronously adjust the playback parameters of the audio data and the video data, wherein, the smart terminal being configured to: synchronously output the audio data having the adjusted playback parameters to the audio terminal and output the video data having the adjusted playback parameters to the vehicle-mounted terminal; and receive and play only the video data having the adjusted playback parameters sent from the smart terminal.

2. The vehicle-mounted terminal as claimed in claim 1, wherein the first connection comprises at least one of a wired connection and a wireless connection.

3. The vehicle-mounted terminal as claimed in claim 2, wherein the first connection comprises the wireless connection, during an establishment process of the first connection, the vehicle-mounted terminal pairs with the smart terminal via Bluetooth, and establishes a Bluetooth connection with the smart terminal; after the Bluetooth connection is established, WiFi is activated, the vehicle-mounted terminal establishes a WiFi connection with the smart terminal, and the Bluetooth connection is disconnected.

4. The vehicle-mounted terminal as claimed in claim 3, wherein the vehicle-mounted terminal is configured to send a media request to the smart terminal via the first connection, and the smart terminal is configured to enable the audio data to be preferentially transmitted via WiFi based on the media request.

5. The vehicle-mounted terminal as claimed in claim 1, wherein after receiving a setting instruction, the vehicle-mounted terminal is in a preset state based on the setting instruction, and when in the preset state, the vehicle-mounted terminal is configured to respond to the video transmission request and ignore the audio transmission request.

6. The vehicle-mounted terminal as claimed in claim 5, wherein:

when the first connection comprises a wired connection, the audio data of the vehicle-mounted terminal is capable of being output through a wired audio interface;

when receiving the audio transmission request, the vehicle-mounted terminal detects whether a wired audio device is connected to the wired audio interface; and when the vehicle-mounted terminal detects that no wired audio device is connected to the wired audio interface, the vehicle-mounted terminal ignores the audio transmission request.

7. The vehicle-mounted terminal as claimed in claim 6, wherein when the vehicle-mounted terminal detects that the wired audio device is connected to the wired audio interface, the vehicle-mounted terminal responds to the audio transmission request, receives the audio data, and plays the audio data through the wired audio device.

8. The vehicle-mounted terminal as claimed in claim 1, wherein the first connection comprises at least one of a CarPlay connection and an Android Auto connection.

9. A vehicle-mounted playback system, comprising a vehicle-mounted terminal, an audio terminal, and a smart terminal, wherein:

the audio terminal is a terminal that is independent from a vehicle in which the vehicle-mounted terminal is mounted; the vehicle-mounted terminal is indirectly communicatively connected to the audio terminal; a first connection is established between the vehicle-mounted terminal and the smart terminal, and a second connection is established between the audio terminal and the smart terminal;

the smart terminal is configured to, based on a user's instruction, send at least one of a video transmission request and an audio transmission request to the vehicle-mounted terminal via the first connection;

when the smart terminal sends both the video transmission request and the audio transmission request to the vehicle-mounted terminal, the vehicle-mounted terminal is configured to respond to only the video transmission request and ignore the audio transmission request;

the smart terminal is configured to, based on a response of the vehicle-mounted terminal to the video transmission request, transmit video data to the vehicle-mounted terminal via the first connection; and configured to, based on a nonresponse of the vehicle-mounted terminal to the audio transmission request, send audio data to the audio terminal via the second connection;

the vehicle-mounted terminal is configured to receive and play only the video data, and the audio terminal is configured to receive and play the audio data;

the audio data and the video data are sent synchronously by the smart terminal;

the vehicle-mounted terminal is configured to: receive and parse a control instruction, input by a user, for adjusting playback parameters; and forward the parsed control instruction to the smart terminal;

the smart terminal is configured to: synchronously adjust the playback parameters of the audio data and the video data based on the parsed control instruction; and synchronously output the audio data having the adjusted playback parameters to the audio terminal and output the video data having the adjusted playback parameters to the vehicle-mounted terminal;

the vehicle-mounted terminal is configured to receive and play the video data having the adjusted playback parameters sent from the smart terminal; and the audio terminal is configured to receive and play the audio data having the adjusted playback parameters sent from the smart terminal.

10. The vehicle-mounted playback system as claimed in claim 9, wherein the first connection comprises at least one of a wired connection and a wireless connection, and the second connection comprises at least one of the wired connection and the wireless connection.

11. The vehicle-mounted playback system as claimed in claim 10, wherein the first connection comprises the wireless connection, during an establishment process of the first connection, the vehicle-mounted terminal pairs with the smart terminal via Bluetooth, and establishes a Bluetooth connection with the smart terminal; after the Bluetooth connection is established, WiFi is activated, the vehicle-mounted terminal establishes a WiFi connection with the smart terminal, and the Bluetooth connection is disconnected.

12. The vehicle-mounted playback system as claimed in claim 10, wherein the vehicle-mounted terminal is configured to send a media request to the smart terminal, and the smart terminal is configured to enable audio data to be preferentially transmitted via WiFi based on the media request.

13. The vehicle-mounted playback system as claimed in claim 10, wherein:

when the first connection comprises the wired connection, the audio data of the vehicle-mounted terminal capable of being output through a wired audio interface;

when receiving the audio transmission request, the vehicle-mounted terminal detects whether a wired audio device is connected to the wired audio interface; and when the vehicle-mounted terminal detects that no wired audio device is connected to connects to the wired audio interface, the vehicle-mounted terminal ignores the audio transmission request.

14. The vehicle-mounted playback system as claimed in claim 13, wherein when the vehicle-mounted terminal detects that the wired audio device is connected to the wired audio interface, the vehicle-mounted terminal responds to the audio transmission request, receives the audio data, and plays the audio data through the wired audio device.

15. The vehicle-mounted playback system as claimed in claim 10, wherein the first connection comprises at least one of a CarPlay connection and an Android Auto connection.

16. The vehicle-mounted playback system as claimed in claim 10, wherein when the second connection is the wired connection, the audio terminal comprises an audio playback module of the smart terminal.

17. The vehicle-mounted playback system as claimed in claim 10, wherein when the second connection is the wireless connection, the audio playback terminal comprises a Bluetooth audio terminal.

18. An audio playback method applied to a vehicle-mounted terminal, wherein a first connection is established between the vehicle-mounted terminal and a smart terminal, and a second connection is established between the smart terminal and an audio terminal; the audio terminal is a terminal that is independent from a vehicle in which the vehicle-mounted terminal is mounted; the vehicle-mounted terminal is indirectly communicatively connected to the audio terminal; the first connection comprises a wireless connection; the audio playback method comprises:

receiving at least one of a video transmission request and an audio transmission request sent by the smart terminal;

when the video transmission request is received, in response to the video transmission request, receiving and playing video data, and when the audio transmission request is received, ignoring the audio transmission request, such that the vehicle-mounted terminal displaying only the video data, and the smart terminal transmits audio data to the audio terminal, the audio terminal playing only the audio data; wherein, the audio data and the video data are sent synchronously by the smart terminal;

the method further comprises:

the vehicle-mounted terminal receiving and parsing a control instruction, input by a user, for adjusting playback parameters; and forwarding the parsed control instruction to the smart terminal; wherein, the smart terminal is configured to: synchronously adjust the playback parameters of the audio data and the video data based on the parsed control instruction; and synchronously output the audio data having the adjusted playback parameters to the audio terminal and output the video data having the adjusted playback parameters to the vehicle-mounted terminal; and the vehicle-mounted terminal receiving and playing the video data having the adjusted playback parameters sent from the smart terminal; wherein the audio terminal is configured to receive and play the audio data having the adjusted playback parameters sent from the smart terminal.

19. The audio playback method as claimed in claim 18, wherein the first connection comprises at least one of a wired connection and a wireless connection, and the second connection comprises at least one of the wired connection and the wireless connection.

* * * * *